United States Patent [19]

Williams

[11] Patent Number: 5,425,624
[45] Date of Patent: Jun. 20, 1995

[54] OPTICAL FLUID-LEVEL SWITCH AND CONTROLS FOR BILGE PUMP APPARATUS

[75] Inventor: Jack L. Williams, Orange, Calif.

[73] Assignee: ITT Corporation, New York, N.Y.

[21] Appl. No.: 141,845

[22] Filed: Oct. 22, 1993

[51] Int. Cl.⁶ .............................................. F04B 49/00
[52] U.S. Cl. ...................................... 417/36; 73/293; 250/901; 222/64
[58] Field of Search ............................ 417/36; 73/293; 250/901; 222/64

[56] References Cited

U.S. PATENT DOCUMENTS

| | | | |
|---|---|---|---|
| 4,156,149 | 5/1979 | Vaccari | 73/293 |
| 4,171,932 | 10/1979 | Miller | 417/36 |
| 4,297,588 | 10/1981 | Hastbacka | 73/293 |
| 4,425,794 | 1/1984 | Duesbury | 73/293 |
| 4,836,632 | 6/1989 | Bardoorian | 350/96.2 |
| 4,870,292 | 9/1989 | Alpert et al. | 73/293 |
| 4,994,682 | 2/1991 | Woodside | 73/293 |
| 5,238,369 | 8/1993 | Farr | 417/36 |

FOREIGN PATENT DOCUMENTS 2534057  2/1977  Germany .............................. 250/901

*Primary Examiner*—Richard A. Bertsch
*Assistant Examiner*—Xuan M. Thai
*Attorney, Agent, or Firm*—Menotti J. Lombardi

[57] ABSTRACT

An optical bilge pump apparatus has two optical fibers with gaps cut therein and associated light transmitters-receivers. The apparatus is responsive to high and low liquid levels in the pump such that the pump is turned on when both gaps in the optical fibers are submersed in liquid, and the pump is turned off when both gaps in the optical fibers are not submersed in liquid.

23 Claims, 5 Drawing Sheets

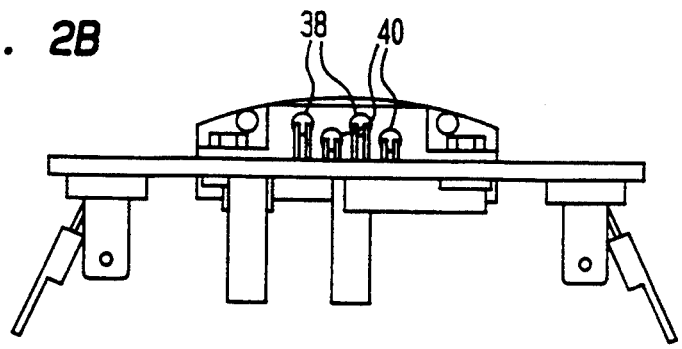
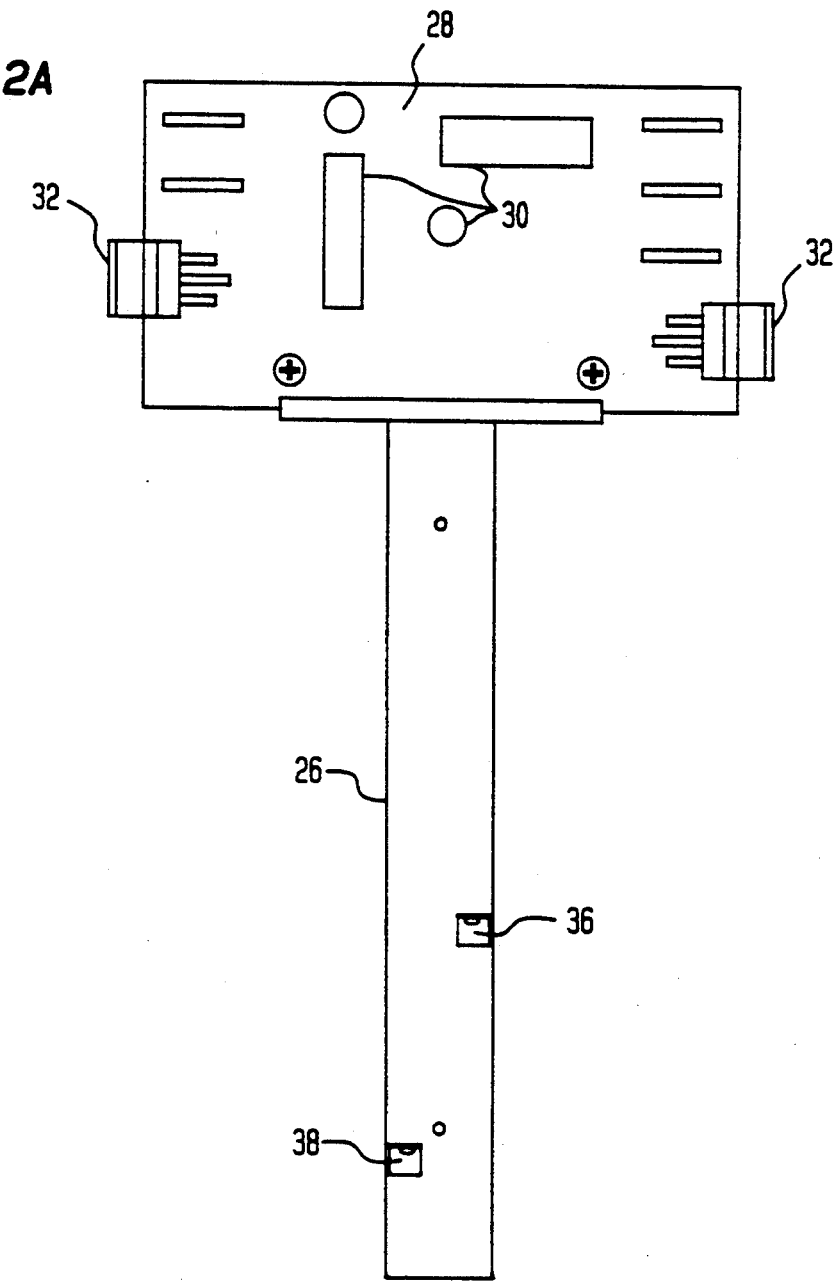

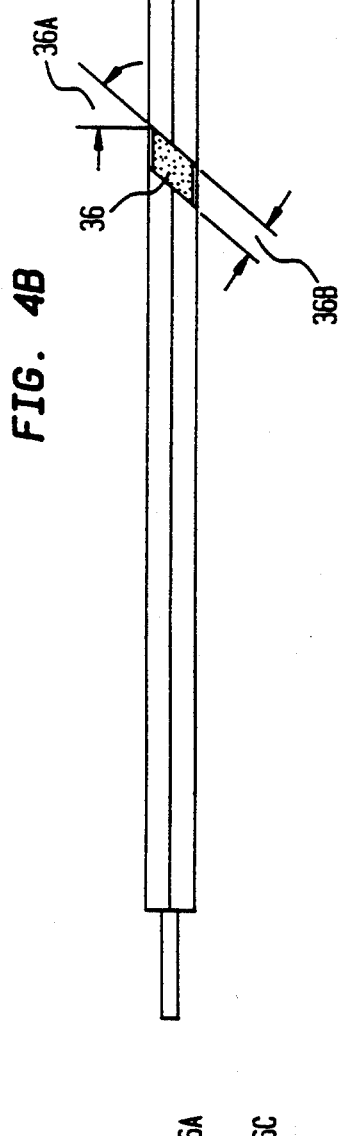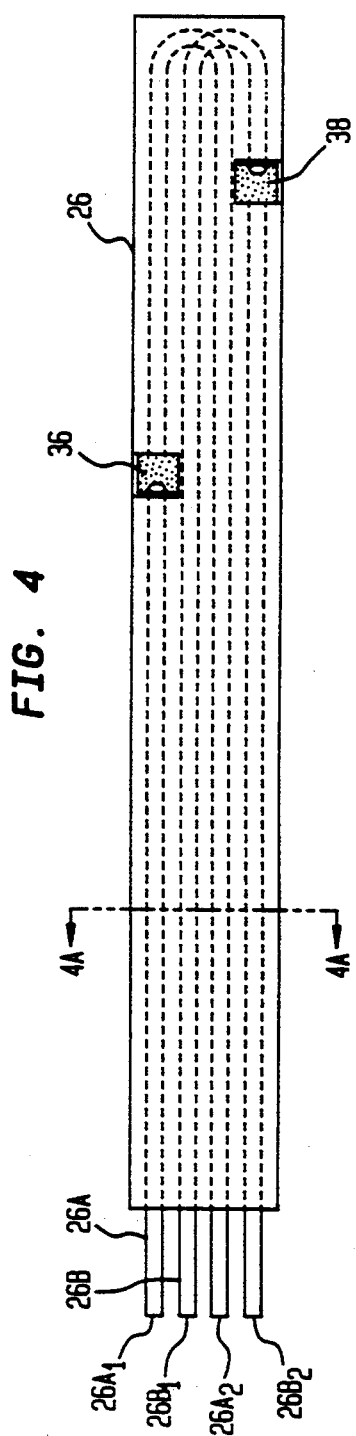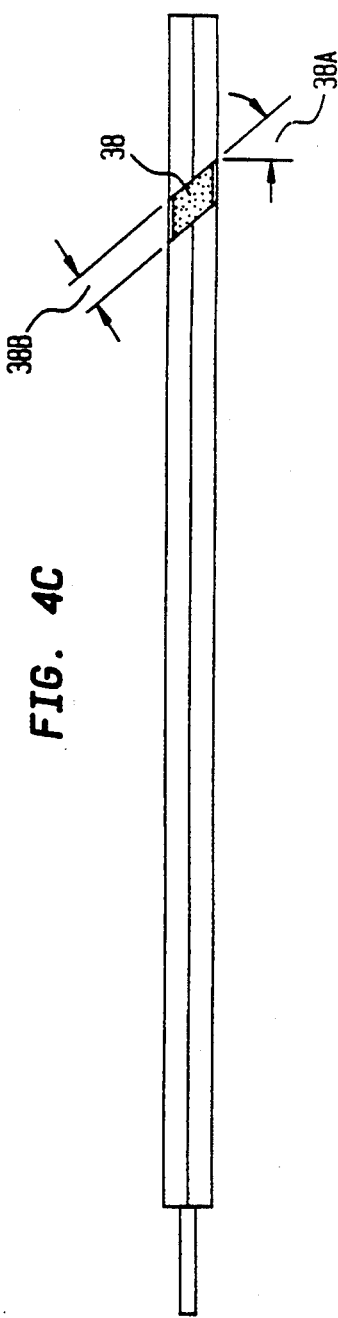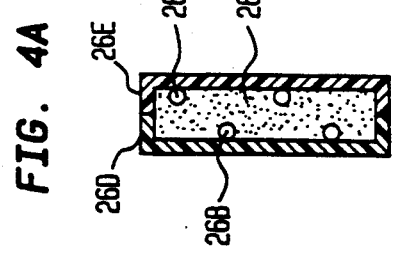

OPTICAL FLUID-LEVEL SWITCH AND CONTROLS FOR BILGE PUMP APPARATUS

BACKGROUND OF THE INVENTION

This invention relates to bilge pumps, and more particularly to bilge pump apparatus having fiber optical conductors and associated transmitters-receivers.

One type of liquid level control for pumping units is known from U.S. Pat. No. 2,424,657 (H. Goodman) in which the operation of a switch depends on an electrically conductive liquid completing an electric circuit to operate a relay for motor operation.

Another type of liquid level control system for a pump motor is known from U.S. Pat. No. 2,975,347 (E. J. Schaefer). This system depends on the fast or slow transmission of heat from a constant source to a bi-metal switch through a shield. The absence of water allows fast conduction of heat through the shield to the switch. The presence of water cools the shield and the transfer of heat is much slower, so that the switch is not activated when water is present.

In U.S. Pat. No. 3,352,246 (Mitsuo Inoue), an automatic submersible pump is operated depending upon the conduction of electricity through water to detect the presence of the water. Conventional tilt type switches to detect water levels is disclosed in U.S. Pat. No. 4,437,811 (Iwata, et al.). The use of electrical or electronic logic means provide the option of running two pumps, interlinked by control means.

The apparatus in U.S. Pat. No. 4,287,427 (Seifres) detects the level of a liquid in a container by modulating the intensity of light through a fiber-optic light guide, a section of which has the cladding removed or partially removed to provide areas where the cladding is thin or absent. Thus the light transmission of the fiber is reduced in the presence of water.

In U.S. Pat. No. 4,950,886 (Claus, et al.), an optical fiber device is disclosed for use in strain measurement by detecting minor changes in laser pulses through microscopic gaps in rigid optical fibers.

Accordingly, the limitations of the prior art in controlling bilge pumps is solved by the improved and novel apparatus of the invention.

SUMMARY OF THE INVENTION

An object of the invention is to provide an improved apparatus for operation of a bilge pump using optical fibers.

Another object of the invention is to detect the level of liquid by means of the transmission or non-transmission of light across a bias cut gap in the optical fiber.

According to the broader aspects of the invention, the optical bilge pump apparatus includes optical fibers with gaps therein, wherein the detection of the level of liquid and control of the bilge pump is effected by detecting light transmission across the gaps due to the presence or absence of liquid, and electronic means provide for converting light generated electrical signals into switching functions for controlling the bilge pump.

A feature of the invention is that the optical fiber gap is cut at an angle so that the cut end refracts light out of the axis direction of the fiber.

Another feature of the invention is the use of infrared light wave length to make detection of the level in contaminated liquids, such as highly contaminated water, more effective.

BRIEF DESCRIPTION OF THE DRAWINGS

Other objects and advantages of the invention will become more fully apparent from the following description of the preferred embodiment, the appended claims, and the accompanying drawings in which:

FIG. 2A illustrates the optical switch assembly according to the invention;

FIG. 2B is a top view of the assembly of FIG. 2A;

FIG. 4 illustrates the optical fiber body assembly;

FIG. 4A is a sectional view taken along lines 4A—4A of FIG. 4;

FIG. 4B is a side view of the assembly of FIG. 4 showing the upper bias cut-out gap;

FIG. 4C is a side view of the assembly of FIG. 4 showing the lower bias cut-out gap;

DETAILED DESCRIPTION OF THE PREFERRED EMBODIMENT

Figure 1:
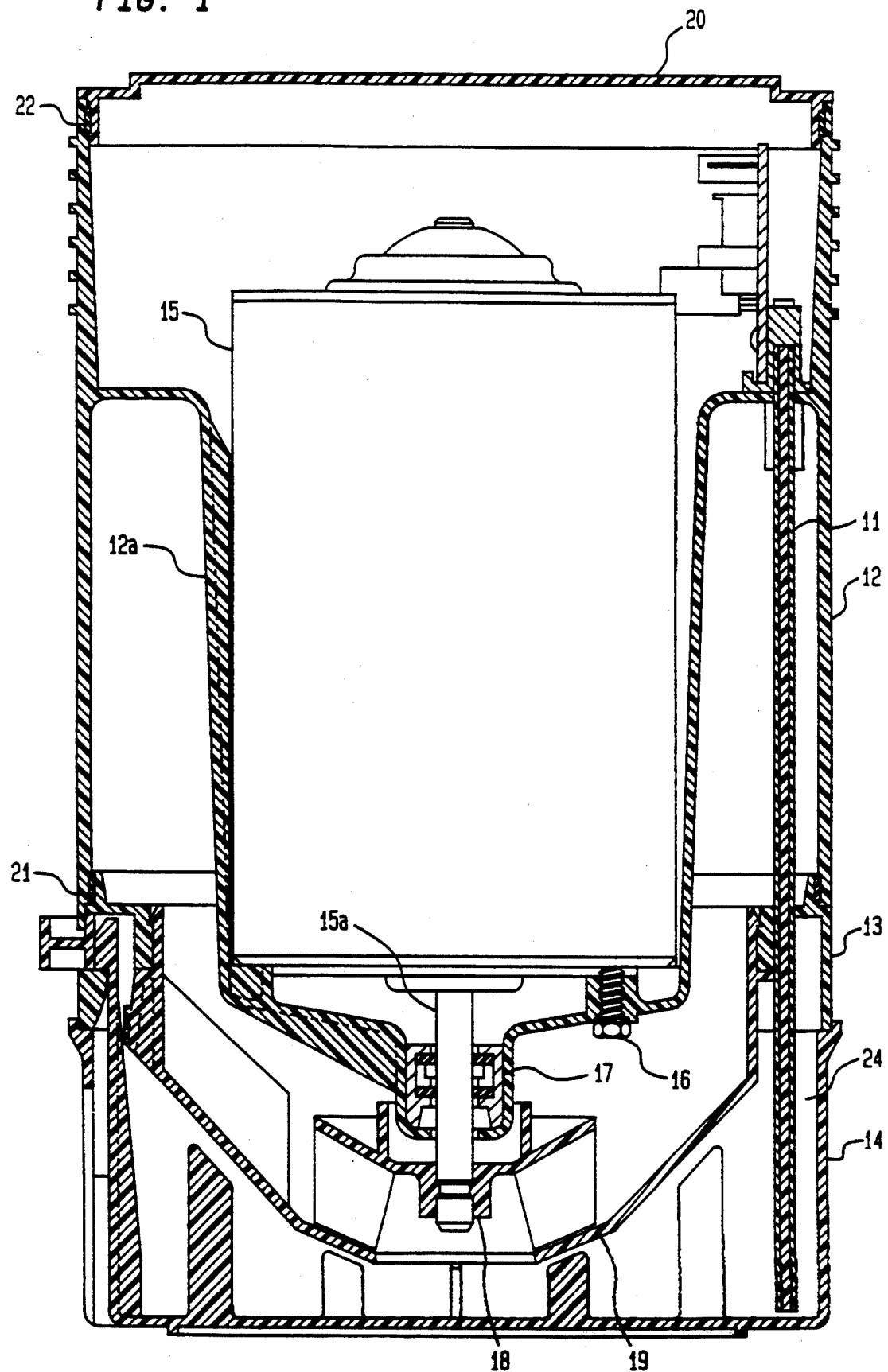
FIG. 1 is a cross-sectional view of the optical bilge pump apparatus of the invention.

Referring to FIG. 1, the apparatus includes an optical switch assembly 11 mounted in housing body 12, and extending through lower housing body 13 and bottom basket 14. Motor 15 is mounted to the interior wall 12a of housing body 12 and retained by one or more screws 16. The shaft 15a of motor 15 extends through dual seal 17 and has mounted on the end thereof impeller 18. A baffle 19 is positioned around the impeller. A cap 20 encloses the housing body. The housing body, lower housing body, bottom basket, baffle, cap, and impeller are preferably made of a moldable plastic suitable for the pumping service, and thermoplastic tape (trade name, Emaweld or Emabond) 21, 22 is utilized for sealing the joints.

The channel 24 created between the basket 14 and the baffle 19 fills with liquid to be detected by the optical switch assembly 11. Referring now to FIG. 2A, the optical switch assembly is illustrated and includes an optical fiber body assembly 26, printed circuit board 28 with components 30 and connectors 32. The assembly 26 has an upper gap 36 and a lower gap 38. FIG. 2B shows in a top view the two transmitter-receiver pairs 39, 40, optically coupled to the fiber optic conductors in assembly 26.

Figure 3:
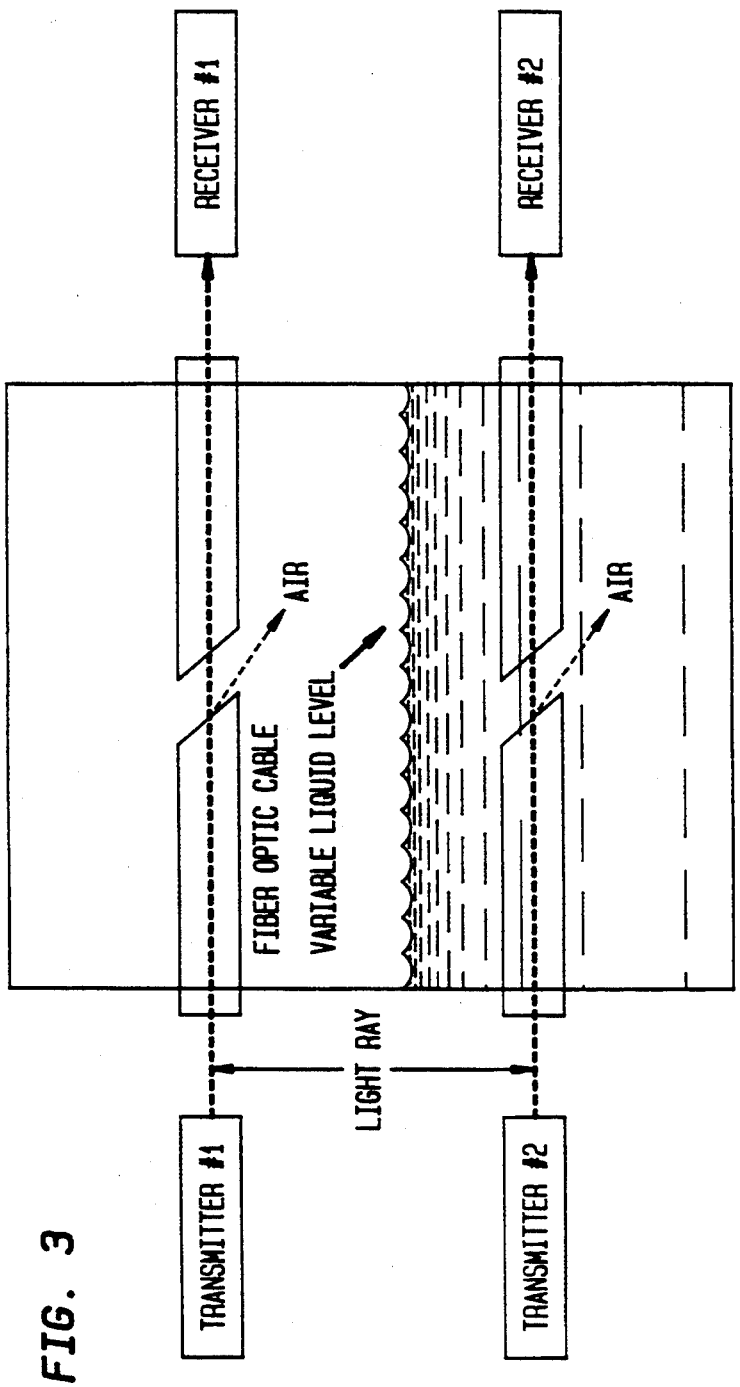
FIG. 3 illustrates the theory of operation of the optical switch for the invention.

The theory of operation of the bilge pump switch will best be understood with reference to FIG. 3. If a fiber optic conductor is made with one end flat and normal to the optic axis, and the other end cut at an angle not normal to the optic axis, 45 degrees for the preferred embodiment, then a light ray entering the normal end will travel the length of the optic conductor and emerge from the angled end at some angle to the optic axis. The emergence angle will depend on the refractive index of the optic conductor, and the refractive index of the surrounding liquid medium.

The refractive index of the fiber optic conductor used in the preferred embodiment of the optical bilge pump switch is 1.3. When a ray emerges from this medium into air, with a refractive index of 1.0, considerable light ray bending occurs. However, if the light ray emerges into, for example, water, with a refractive index of 1.3, no bending will occur, and the light ray will travel through the water in a straight line. If the surrounding medium is air, the light ray receiver placed a short distance from the emergence end of the fiber optic conductor will not receive the light ray since it will be refracted and not be conducted to the receiver. If the ray emerges into water as the surrounding medium, the ray will not be refracted and will be conducted to the receiver. Since the receiver has a light sensor, it can indicate when the optic system is, or is not, submersed in a liquid.

For the optical bilge pump switch apparatus of the invention, two optical gaps are positioned one above the other; one at the low water level pump turn off point, and the other at the high water level pump turn on point. The electronic logic is designed so that the pump is turned on when both gaps are immersed in liquid, and the pump is turned off when both gaps are not immersed in liquid. All other combinations are ignored.

FIG. 4 illustrates the optical fiber body assembly 26 containing a first optical fiber conductor 26A and a second optical fiber conductor 26B. Conductor 26A has an entrance face 26A1 and exit face 26A2. Conductor 26B has an entrance face 26B1 and an exit face 26B2. The conductors 26A, B as shown in FIG. 4A are embedded in a bonded epoxy filler 26C and surrounded by a two-piece plastic cover 26D, E. An upper bias cut is made in conductor 26A of assembly 26 to form a gap 36, and a lower bias cut is made in conductor 26B of assembly 26 to form a gap 38. As shown in FIG. 4B, gap 36 is formed by a bias cut at an angle 36A of approximately 45° with a width 36B of approximately 0.12 inches in the preferred embodiment. Similarly, as shown in FIG. 4C, gap 38 is formed by a bias cut on an angle 38A of approximately 45° with a width 38B of approximately 0.12 inches in the preferred embodiment. In this preferred embodiment, the conductors 26A, B have a diameter of 0.06 inches.

Figure 5:
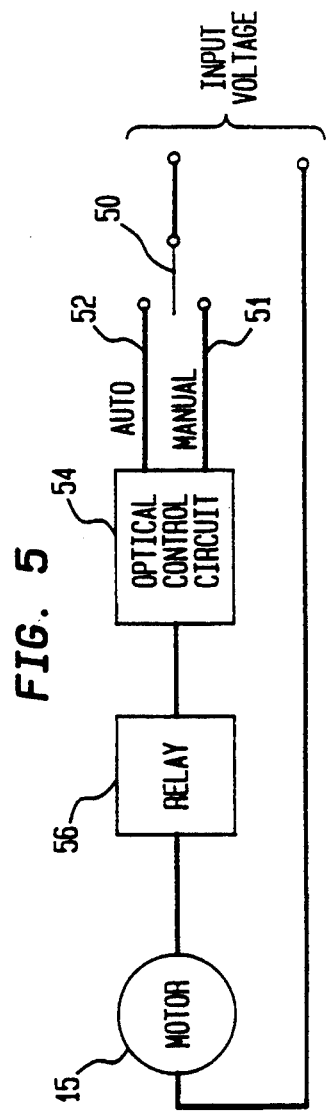
FIG. 5 is a block diagram of the control for the bilge pump motor.
Figure 6:
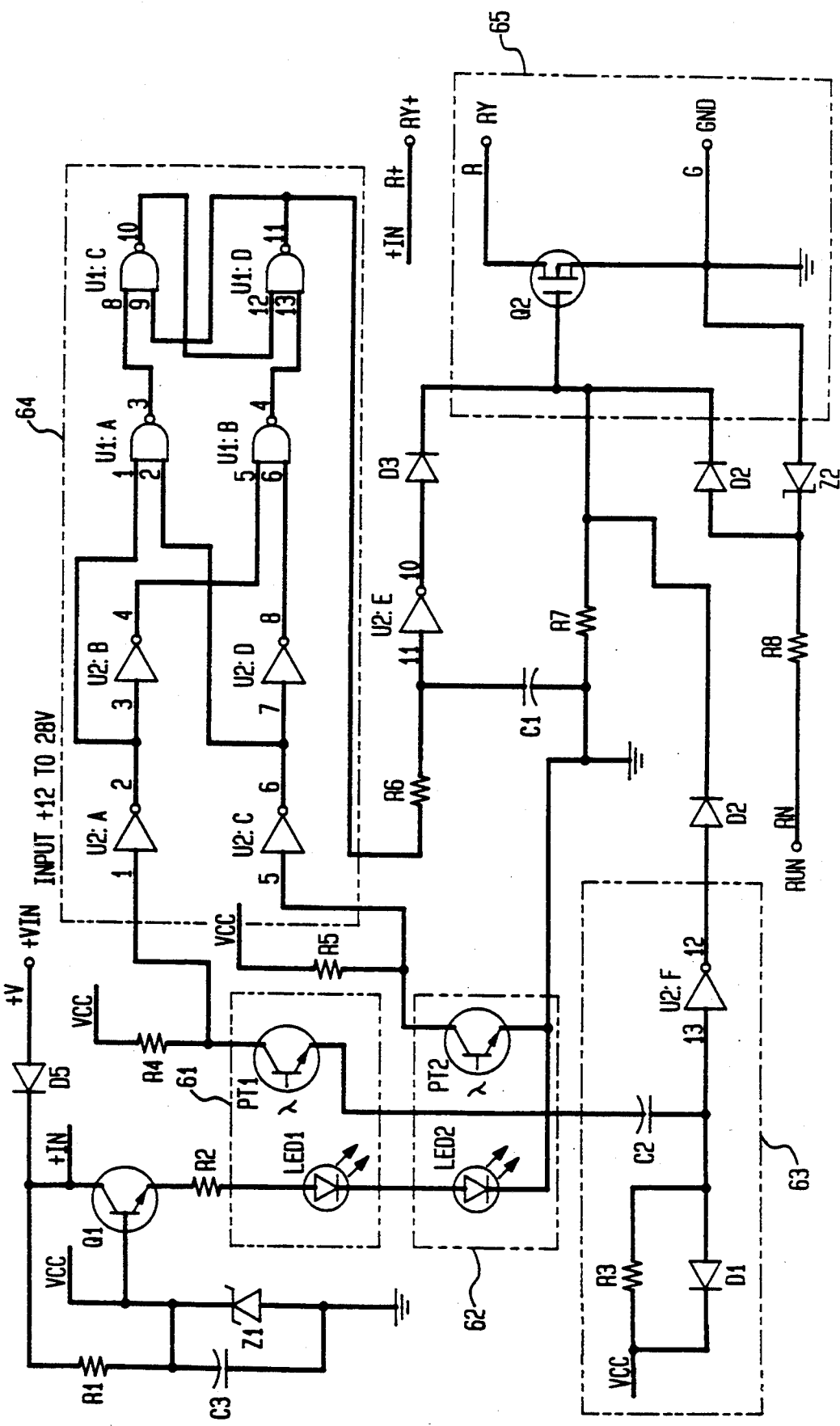
FIG. 6 is a schematic diagram of the optical control circuit.

FIG. 5 is a block diagram illustrating the control means for turning the bilge pump motor 15 on and off. An input voltage from 12 to 28 VDC is applied to a toggle switch 50 which has an off, auto, and manual position. With the switch 50 in the manual position 51, the input voltage by-passes the logic circuit portion of the optical control circuit 54 to energize relay 56 to turn on motor 15. In the auto position 52, the input voltage is coupled to the optical control circuit 54 which controls the relay to turn the relay on and off depending on the level of liquid in channel 24 (FIG. 1). The logic circuits, as further described in connection with FIG. 6, are designed so that the motor is turned on when both gaps 36 and 38 in the optical switch assembly are immersed in the liquid, and the motor is turned off when both gaps 36 and 38 are not immersed in the liquid. As discussed in connection with FIG. 3, when the gaps are immersed in liquid, the light ray passes through the liquid to be detected by the receivers, and when the gaps are not immersed in liquid, the light ray is refracted in air and no light is detected at the receivers. Infra-red light is utilized as the light ray since it is suitable for use in many liquids including clear, murky, or oil contaminated waters.

Referring to FIG. 6, the circuit arrangement for implementing the optical control circuit of FIG. 5 is shown according to a preferred embodiment. The major sections of the circuit include transmitter-receiver 61, transmitter-receiver 62, a timer 63, on-off logic 64, and relay on-off control 65. As shown, an input voltage of +12 to 28 vdc is applied at +VIN through diode D5. D5 provides an automatic power disconnect in case of accidental reverse voltage application. The output of D5 is applied to R1 and Z1. At the junction of R1 and Z1, the voltage is regulated to +10 vdc. This regulated voltage is marked VCC throughout the diagram and is used to power the integrated circuits. Q1 is supplied with voltage from +IN, and is connected through R2 to LED-1 and LED-2. Q1 is referenced to VCC, and supplies regulated voltage to the light emitting diodes.

C2, R3, and D1 form a timer that applies a signal to pin 13, of U2:F, every time that the power is turned on. This signal lasts for 10 seconds and causes the motor to run for proof of operation. This start-up signal is initiated by the hand operated switch 50 (FIG. 5) and comes from pin 12 of U2:F, through diode D2, and to the on-off control gate of Q2. The signals at the junction of R4 and PT-1, and at the junction of R5 and PT-2, go low when the gaps 36, 38 (FIG. 2A) are immersed in the liquid. U2:A and U2:C invert these analog signals and convert them to digital logic levels. Each U1 gate performs the logic operation $(A \cdot B = \overline{C})$, and each U2 inverter performs the logic operation $(A = \overline{B})$.

U2:B, U2:D, U1:A, and U1:B perform the logic that turns the motor on and off with the rising and falling of the liquid level. (Upper and lower gaps 36, 38 under the liquid=motor on; and upper and lower gaps 36, 38 out of liquid=motor off.) The motor on signal comes from pin 3, U1:A, and the motor off signal comes from pin 4, U1:B.

U1:C and U1:D form an electronic toggle that is set to on with an input to pin 8, U1:C, and to off with an input to pin 13, U1:D. The motor on-off signal comes from pin 11, of U1:D. The signal is applied to the R6 - C1 filter circuit. The long time constant of this filter prevents false triggering of the motor by short duration turbulence in the liquid. The signal is inverted by U2:E, and applied through D3 to the on-off control gate of Q2.

Manual operation is accomplished by applying +12 to 26 vdc to the RUN input through the manual operation of switch 50 (FIG. 5). The voltage goes through R8 to the on-off control gate of Q2. Diode Z2 prevents high input voltage from damaging the control gate of Q2.

Typical values and identification of components shown in the circuit of FIG. 6 are as follows:
D5—1 amp. power diode
R1—880 ohms
C3—0.1 MFD
Z1, Z2—10 volt regulator diodes
Q1—TIP-29 NPN
R2—220 ohms
LED1, LED2—infra-red light emitting diodes
PT1, PT2, photo transistors
R3—100K ohms
D1-D4—IN914 diodes
C1, C2—4.7 MFD
R4, R5—150K ohms
R6, R7—100K ohms
Q2—IRF 510 MOS
R8—4.7K ohms
U1—Type 4011 1C (4 independent, 2 input NAND gates: U1:A to U1:D)
U2—Type 4069 1C (6 independent voltage inverters: U2A to U2:F)

While the present invention has been disclosed in connection with a preferred embodiment thereof, it should be understood that there may be other embodiments which fall within the spirit and scope of the invention as defined by the following claims.

What is claimed is:

1. Apparatus comprising:
   a pump housing;
   a motor and impeller mounted within said housing;
   an optical switch assembly mounted within said housing to detect liquid levels within said housing;
   said assembly including a pair of fiber optic conductors, each conductor having a gap therein; and
   said assembly having control means optically coupled to said fiber optic conductors for turning said motor on and off depending the liquid level being above or below each said gap.

2. The apparatus of claim 1, wherein
   said fiber optic conductors being mounted in parallel and each gap being formed with a bias cut; and
   said gap in each of said conductors are displaced one above the other, whereby said control means turns on said motor when said gap in each said conductor is immersed in liquid, and turns off said motor when each said gap is not immersed in liquid.

3. The apparatus of claim 2 including
   a light emitting diode coupled to each said conductor to transmit light into one end thereof, and a photo transistor coupled to each said conductor to receive light at the other end thereof; and
   the transmitted light being coupled and detected when said gap of each conductor is immersed in the liquid, and the transmitted light being refracted and not detected when said gap of each conductor is not immersed in liquid.

4. The apparatus of claim 3 wherein
   said light emitting diode is an infra-red light emitting diode.

5. The apparatus of claim 4 wherein
   said control means includes logic circuit means to turn on said motor when said gap in each of said conductor is immersed in liquid, and to turn off said motor when said gap in each of said conductor is not immersed in liquid.

6. The apparatus of claim 5, wherein
   said logic circuit means includes filter circuit means having a time constant to prevent false start of said motor due to a short duration turbulence in the liquid.

7. In combination:
   a submersible pump mounted within a pump housing;
   relay means coupled to said pump for turning said pump on and off;
   optical control means contained within said housing and coupled to operate said relay means;
   said optical control means including two optical fibers, each fiber coupled to an associated light transmitter and receiver, and each fiber having a gap, one gap in one fiber at a high liquid level point, and another gap in another fiber at a low liquid level point; and
   switch means for energizing said optical control means.

8. The combination of claim 7 wherein said pump is turned on when said one and other gap are both immersed in liquid, and said pump is turned off when said one and other gap are both not immersed in liquid, whereby the light from each said associated light transmitter is refracted at the one and other gap.

9. The combination of claim 8 wherein said associated light transmitter is an infra-red light emitting diode.

10. Optical bilge pump apparatus comprising:
    a bilge pump;
    optical fiber means having gaps therein and being located to detect liquid levels within the bilge pump;
    control means to turn the bilge pump on and off depending on changes in light transmission across said gaps due to the presence or absence of liquid; and
    said control means including infra-red light emitting and receiving means, and means for converting infra-red light generated electrical signals into switching functions for controlling said bilge pump.

11. Pumping apparatus comprising:
    a pump housing having an outer wall and an interior wall mounting section;
    a motor and impeller mounted to said interior section;
    an optical switch assembly mounted to said interior section and within said outer wall to detect liquid levels between said outer wall and said interior section;
    said optical switch assembly including an optical fiber body assembly having a pair of fiber optic conductors having gaps therein, said body assembly being located between said outer wall and said interior section; and
    said assembly having control means optically coupled to said fiber optic conductors for turning said motor on and off depending the liquid level being above or below said gaps.

12. Pumping apparatus of claim 11, wherein
    said body assembly retains said fiber optic conductors in a U-shaped parallel configuration, and each said conductor is formed with a bias cut gap therein; and
    said gap in each of said conductors are displaced one above the other, whereby said control means turns on said motor when said gap in each said conductor is immersed in liquid, and turns off said motor when each said gap is not immersed in liquid.

13. Pumping apparatus of claim 12 wherein
    said optical switch assembly includes a light emitting diode coupled to each said conductor to transmit light into one end thereof, and a photo transistor coupled to each said conductor to receive light at the other end thereof; and
    said photo transistor detecting the transmitted light when said gap in each said conductor is immersed in the liquid, and the transmitted light being refracted and not detected by said photo-transistor when said gap in each said conductor is not immersed in liquid.

14. Pumping apparatus of claim 13 wherein
    said light emitting diode is an infra-red light emitting diode.

15. Pump apparatus of claim 14 wherein
    said control means includes logic circuit means to turn on said motor when said gap in each of said conductor is immersed in liquid, and to turn off said motor when said gap in each of said conductor is not immersed in liquid.

16. Pump apparatus of claim 15, wherein said logic circuit includes filter circuit means having a time constant to prevent false start of said motor due to a short duration turbulence in the liquid.

17. Pump apparatus of claim 16 including:

relay means coupled to said pump for turning said pump on and off.

18. Pump apparatus of claim 17 including switch means for energizing said optical control means, and said switch means having an automatic and manual mode for effection on and off control of said motor.

19. Pump apparatus of claim 18 wherein said housing and impeller are formed of a moldable plastic.

20. Pump apparatus of claim 19 wherein said optical fiber conductors are retained in a rigid manner in said body assembly by an epoxy filler.

21. Apparatus for controlling a drive means comprising in combination:

a housing having a channel for containing a liquid therein;

optical control means contained within said channel and coupled to operate said drive means;

said optical control means including two optical fibers, each fiber coupled to an associated light transmitter and receiver, and each fiber having a gap, one gap in one fiber at a high liquid level point in said channel, and another gap in another fiber at a low liquid level point in said channel; and switch means for energizing said optical control means.

22. The combination of claim 21 wherein said drive means is turned on when said one and other gap are both immersed in said liquid, and said drive means is turned off when said one and other gap are both not immersed in said liquid, whereby the light from each said associated light transmitter is refracted at the one and other gap.

23. The combination of claim 22 wherein said associated light transmitter is an infra-red light emitting diode.

* * * * *